United States Patent [19]
Camarota

[11] Patent Number: 4,925,140
[45] Date of Patent: May 15, 1990

[54] DETACHABLE LEG ASSEMBLY

[75] Inventor: Richard J. Camarota, Holland, Mich.

[73] Assignee: ITC Incorporated, Zeeland, Mich.

[21] Appl. No.: 325,989

[22] Filed: Mar. 20, 1989

[51] Int. Cl.⁵ .............................................. F16M 11/16
[52] U.S. Cl. .................................. 248/188; 248/188.8;
248/151; 403/199
[58] Field of Search ...................... 248/188, 188.7, 500,
248/501, 188.1, 188.8, 188.9, 151; 403/199, 201,
187

[56] References Cited

U.S. PATENT DOCUMENTS

| | | | |
|---|---|---|---|
| 3,464,662 | 9/1969 | Myers | 248/188.1 X |
| 3,565,378 | 2/1971 | Svenson | 248/188.7 |
| 3,865,050 | 2/1975 | Cecchetti | 248/188 |
| 3,869,105 | 3/1975 | Daniels | 248/188.8 |

FOREIGN PATENT DOCUMENTS

| | | | |
|---|---|---|---|
| 208546 | 4/1960 | Austria | 248/188 |
| 822980 | 7/1969 | Canada | 248/188.7 |
| 770609 | 9/1934 | France | 248/188 |
| 614517 | 5/1960 | Italy | 248/188 |

Primary Examiner—Ramon O. Ramirez
Attorney, Agent, or Firm—Price, Heneveld, Cooper, DeWitt & Litton

[57] ABSTRACT

A means for detachably connecting a load supporting member on a pedestal structure incorporates a separable joint between the pedestal leg and the brackets it engages at each end. The means utilizes a sleeve of synthetic resin having surface lubricity which sleeve is bonded to the pedestal leg and has a conical exterior surface which detachably seats into a complementary conical socket of a bracket for connecting the leg either to its support or to the load.

9 Claims, 2 Drawing Sheets

DETACHABLE LEG ASSEMBLY

FIELD OF THE INVENTION

This invention relates to a support assembly in which a support leg of uniform, circular cross section can be detachably and rigidly secured by insertion of the end of the leg into a socket utilizing an externally tapered sleeve of plastic having a lubricious surface characteristic between the leg and the walls of the socket.

BACKGROUND OF THE INVENTION

A variety of supports, including those having single or plural pedestals, have been utilized for supporting tables, chairs, occasional pieces and other structures in an upright, substantially level position. Typically, such furniture is not affixed to flooring and is relatively easily moved when not needed. Also, in the conventional office, commercial establishment or home there is enough space that furniture items can remain in the same place both when in use or not in use. However, there are a number of situations in which various types of furniture, particularly tables and seating, either must or at least for the sake of convenience should be folded up or broken down for compact storage when not in use. There are many situations in which space is at such a premium that it must be capable of plural uses such as for eating, entertaining, sleeping or as an office. The furniture type and arrangement for one use is not compatible with some or all of the other uses, yet space constraints are such that furniture not currently required be removed and compactly stored. Examples of this type of space constraint are mobile homes, motor homes, cruisers and sailboats big enough to have cabin facilities. There are other situations where the space constraints are not as demanding but the usage is either intermittent or seasonal and storage between such uses is either essential or at least very desirable. In this case, the space for storage is often very limited and thus at a premium. Examples of this type of furniture usage include patios, pool side facilities and deck areas around a home or a commercial or recreational facility or the like.

Because of the need for compact storage and of ease of erection and removal, many types of folding furniture, particularly chairs and tables, have been developed. These do provide the desired compactness for storage but because they must employ various types of hinge joints or various fastener arrangements to give the furniture knockdown or "KD" capability they normally lose some of the rigidity desired in use as a result of the furniture being repeatedly changed from one mode to another. Further, such folding and unfolding often causes this condition to become progressively more noticeable.

There are also situations in which the furniture is heavy and cumbersome to handle unless it can be, at least in part, broken down into some of its component parts. Another item which may cause difficulty in moving or storing conventional furniture, whether or not it folds, is the necessity for either plural leg supports or a large base to support and stabilize the furniture.

BRIEF DESCRIPTION OF THE INVENTION

Any practical solution to these problems must, at the very least, make it relatively simple to erect the furniture and break it down again for storage. It must also provide furniture which positively resists wracking, twisting, wobbling or other characteristics indicative of less than positive support. It must be capable of repeated assembly or erection and disassembly or break down. It must also be capable of manufacture at reasonable cost without sacrifice of quality.

These objectives have been attained by providing a support which includes a tubular leg of uniform diameter throughout its length and a pair of brackets, one for each end of the leg. Each of the brackets has a socket, the walls of which have a small uniform taper. The ends of the leg are provided with a tubular sleeve of a plastic material having a surface characterized by some degree of lubricity. The exterior surface of the sleeve is uniformly tapered to be seated in and tightly fit into the socket whereby the leg and the brackets can be telescopically interfitted and firmly locked together but at the same time readily detached by combined rotary and axial movement of one of the legs or the brackets relative to the other.

DESCRIPTION OF THE PREFERRED EMBODIMENT

Figure 1:
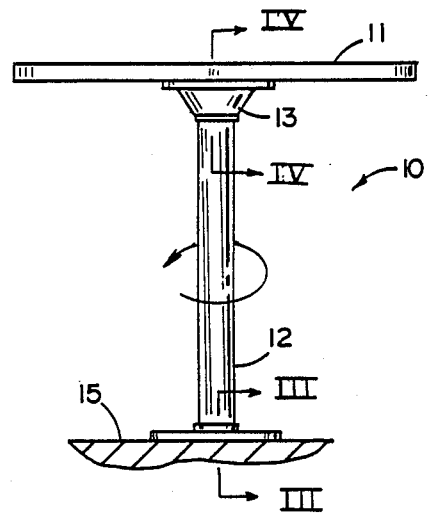
FIG. 1 is a side elevation view of a table supported on a leg incorporating this invention.
Figure 2:
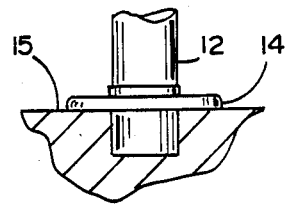
FIG. 2 is a fragmentary side elevation view of the lower bracket and leg assembly.

Referring to FIG. 1, there is illustrated a single pedestal table 10 incorporating this invention. The table has a top 11 and a leg 12. An upper bracket 13 provides a means for connecting the leg 12 to the table top 11. A lower bracket 14 provides a means for connecting the leg 12 to a supporting surface such as a floor or a deck 15.

Figure 8:
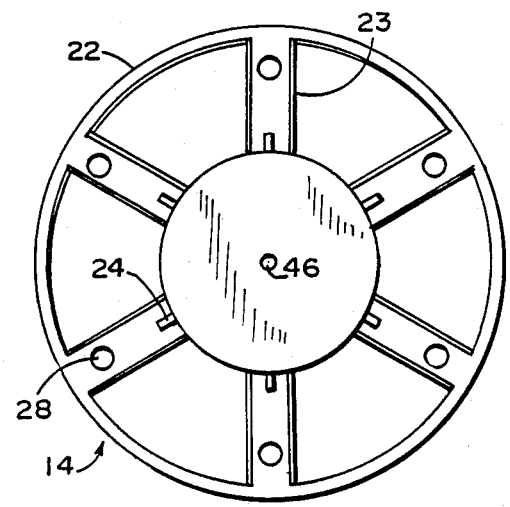
FIG. 8 is a bottom view of the bottom bracket.

The lower bracket 14 has a central socket 20 integral with and surrounded by a flange 21. The flange is illustrated as circular but could be rectangular or oval, for example, without affecting this invention. The flange is illustrated as having a peripheral downwardly curved lip 22 connected to the central socket 20 by radially extending ribs 23 (FIG. 8). These ribs reinforce flange 21. However, they can be omitted or other structure substituted since these ribs, as such, are not part of this invention. The juncture between the socket and the flange is preferably strengthened by the reinforcements 24 since all of the load imposed by the table must be transmitted from the socket walls to the flange 21. The lower bracket is secured to the floor by suitable means such as screws installed in the holes 28.

Figure 3:
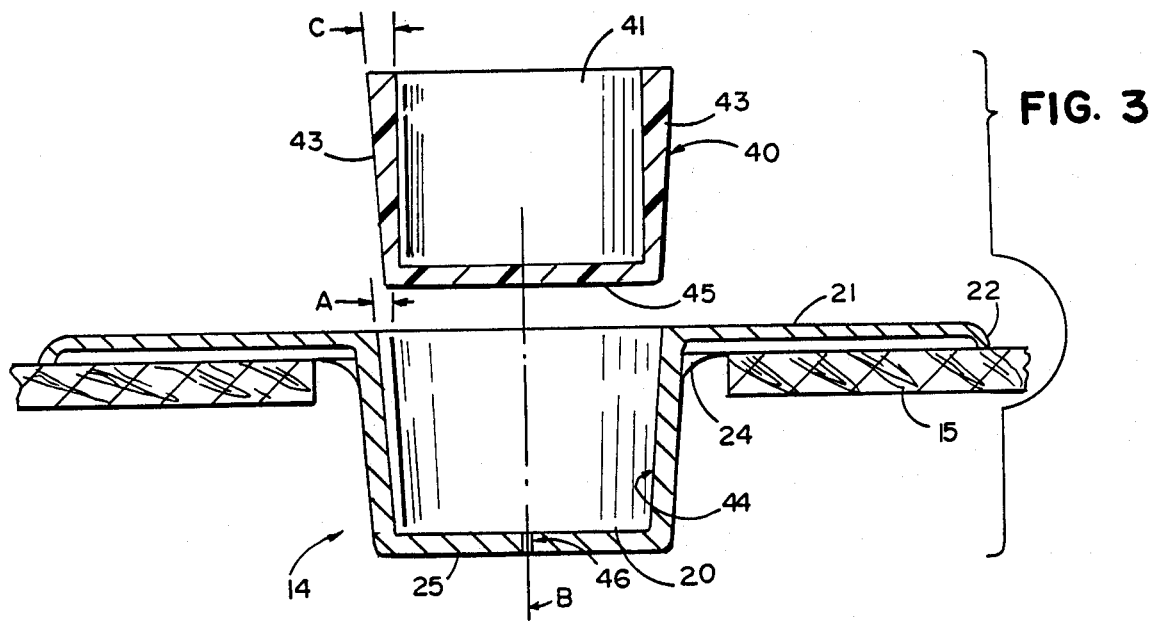
FIG. 3 is an enlarged, exploded central sectional view of the lower bracket for this invention.

The socket 20 is a downwardly extending receptacle of about 2 inches in depth for the lower end of the leg 12. The inside walls of the socket are tapered providing the socket with a downwardly decreasing diameter. The taper A is preferably 2° to the socket's central axis B (FIG. 3). The walls of the socket are preferably smooth as would be the case with a die cast part and the end is closed by the web 25. The closure of the end braces the walls of the socket against loads imposed on them by the table or seat or other load bearing structure supported by the leg.

The upper bracket 13 is similar in size to the lower bracket 14 having a central socket 30 which is recessed upwardly into a central collar 31 which joins the socket to the peripheral flange 32. The flange has openings 33 for fasteners such as screws 34 to anchor the bracket 13 to the object, such as a table top or chair seat 38, which it is to support.

Figure 6:
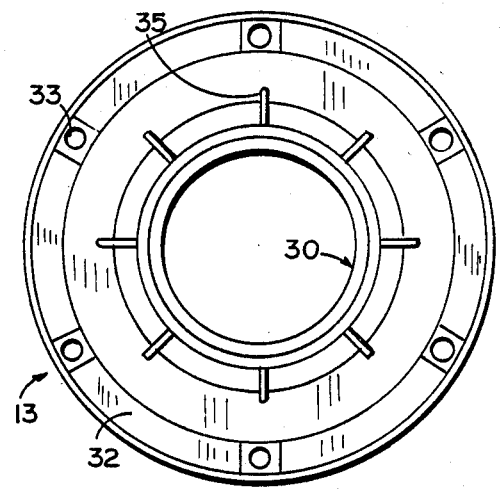
FIG. 6 is a top view of the top bracket.
Figure 7:
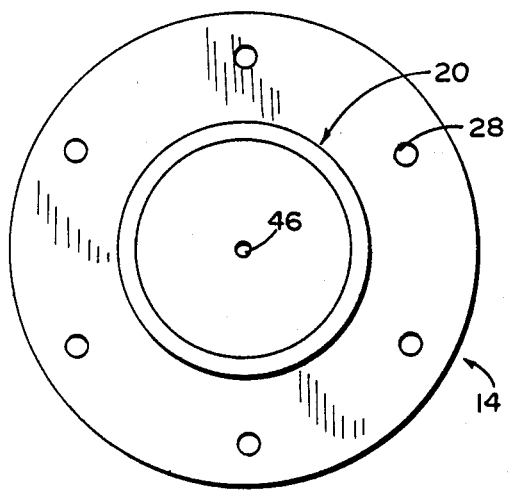
FIG. 7 is a plan view of the bottom bracket.

The central socket 30 is identical in size and shape to the socket 20 including the 2° taper of the socket walls. The socket 30 can differ from that in the lower bracket in that its upper end need not be closed because being at the upper end of the leg the loads imposed on the walls of the socket of the upper bracket are less than those at the socket in the lower bracket since they have not been multiplied by the length of the leg. They can also be reinforced by ribs 35 (FIG. 6). The necessity for such ribs depends upon the magnitude of the loads to which the bracket is expected to be subjected.

Both the upper and the lower brackets can be aluminum die cast parts. Die casting is particularly desirable because it permits the casting to be reproduced in quantity to close tolerances, particularly that of the taper and dimensions of the sockets without machining. Also, it permits the sockets to be produced with very uniform and accurate tapers, which accuracy, as will be explained subsequently, is important to this invention. Also, the surface of the socket can be made smooth which is another characteristic important to this invention.

The leg 12 is a tubular member, preferably of steel because of carbon steel's lower cost as compared to aluminum or stainless steel. Because the taper which is essential to the functionality of this invention is provided by the sockets 20 and 30 and the sleeves 40, the leg can be of uniform inner and outer diameter throughout its length. Therefore, it can be fabricated simply by cutting it to length from suitable stock, such as, for example, 2 inch diameter 0.035 inch wall steel pipe stock. It is also possible to utilize fiberglass reinforced plastic tubing of the same diameter for the leg.

The leg 12 has been described as of uniform shape and cross section throughout its length, this is obviously the most desirable design from the standpoint of simplicity, cost and pure functionality. However, it will be recognized that the necessity for the circular cross section of uniform diameter is only necessary at the ends of the leg over which the sleeves 40 are mounted. That portion of the legs between the sleeves can be of any of a number of cross-sectional shapes and may be a cross sectional size greater or smaller than the ends. In fact, lengthwise, the leg could have a laterally extending portion whereby the upper and lower portions of the leg are laterally offset from each other. This arrangement could be advantageous in a bus or motor home between seats so that the base of the leg, for example, is adjacent the side wall with the table extending over an obstruction free area beneath the table for people sitting at the table to place their feet.

Each end of the leg is capped with a sleeve 40. The sleeves are identical and each has an interior opening 41 of uniform diameter throughout, its length of a size to closely fit around the end of the leg. The sleeve is bonded to the leg by a suitable adhesive, the choice of which will depend upon the plastic from which the sleeve is cast. It is necessary that the sleeve have at least some degree of surface lubricity to permit attachment and detachment of the leg from the end brackets. Polypropylene has been found to be a suitable material from which to mold the sleeve. Other materials considered to be suitable for the sleeve are nylon and acrylonitrile-butadiene styrene (ABS). In the case of polypropylene, a suitable adhesive is epoxy and for nylon it could be a polyamide and for ABS an acrylic.

The density of the material of the sleeve is important because when the end of the leg is fully seated in the socket, the sleeve must be substantially incompressible. Thus, as the leg is inserted in the bracket sockets, whatever compressibility the material has must be overcome sufficiently that under the operating loads imposed on the object to be supported, the sleeve will act as if it were incompressible. Failure to do this will result in the leg being capable of some degree of rock or wobble, adversely affecting the functionally of the supported object. At the same time, the ability to separate the sleeve and bracket with the use of rotational or axially applied force of the type the average person can apply without tools must be maintained. It is for this reason that a certain degree of surface lubricity is necessary to initiate separation when desired.

It is necessary to cast the sleeves because, while having a constant internal diameter, the outer face 43 is uniformly tapered with the least diameter being adjacent the closed end of the tube. This taper, indicated by the letter C in FIG. 3, is preferably 2° to the sleeve's inside surface which is parallel to the sleeve's central axis B. The taper has to be the same as that of the inside surface 44 of the socket into which it is fitted which is indicated by the angle A in FIG. 3. The end 45 of the sleeve which seats over the end of the tube closes the end of the tube.

Figure 4:
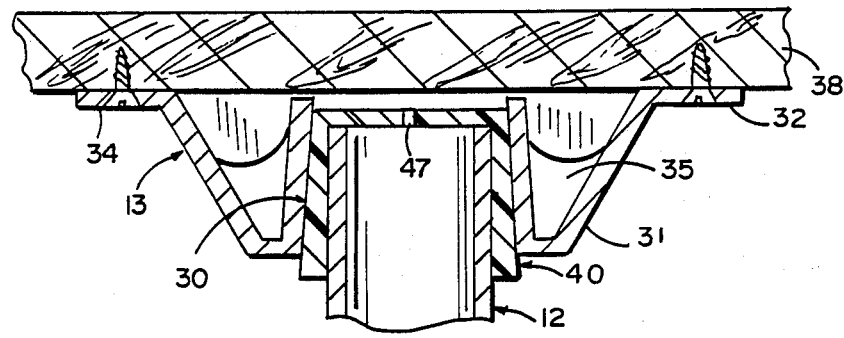
FIG. 4 is an enlarged central sectional view of the upper bracket for this invention with the leg assembled.
Figure 5:
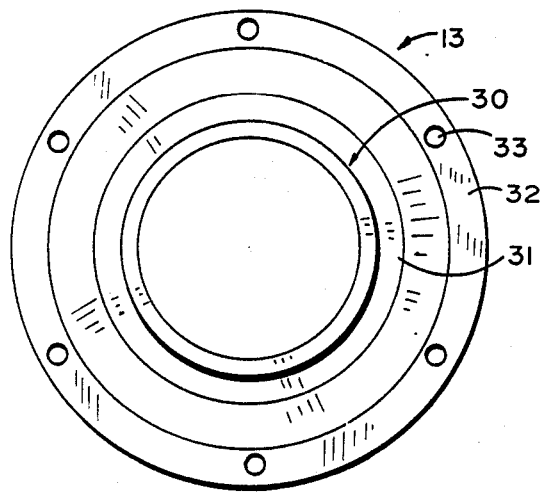
FIG. 5 is a bottom view of the top bracket.

If the lower bracket is installed in a support where it will be subject to water, such as from rain on a patio, a small drain hole 46 of about ⅛ inch diameter should be provided in the closed end of the socket. If the same sleeve is used at both ends of the leg, the interior of the leg becomes a sealed chamber. It has also been found necessary to provide pressure relief for gas trapped in the leg since this pressure changes significantly due to changes in both temperature and barometric pressure. These pressure changes can be relieved by providing a 1/16 inch diameter hole 47 in the center of the end web of the sleeve 40 (FIG. 4). Preferably, such an opening is provided only in the sleeve which seats in the upper socket 30. However, since the legs 12 normally will have no clearly visible identification to distinguish one end from the other, it may be advisable to provide such an opening in the sleeves at both ends. An opening of this diameter will prevent the sleeve being forced off or ruptured due to exposure of the leg to high temperatures such as can occur if left in the sun in summer. If for any reason the socket into which the tube is vented is also closed it will be necessary to provide it with a similar vent opening.

The portion of the exterior surface of the tube not covered by the sleeves can be protected by plating or powder coating. If the tube is aluminum, it will not require this treatment. If the tube is steel, the presence of the sleeves at both ends seals the tube preventing moisture from entering the tube to cause rust of the interior surface. The functionality of the sleeves to prevent the entrance of moisture is not impaired by the relief opening 47.

The depth of the sockets 20 and 30 must be sufficient for a positive, non-rockable interlock between the leg and the brackets. A socket having a depth of 2½ inches. Preferably, the sleeve is somewhat longer than the socket so that a small portion of it projects beyond the end of the socket when the end of the leg is fully seated.

If the object to be supported is too large to be supported on a single pedestal, two or more of the pedestals incorporating this invention can be utilized. In making this type of installation, it simplifies the task if the lower brackets are first attached to the floor in a pattern suitable to support the object such as a table or a bench. Then, the legs are mounted in the sockets of the floor brackets and the upper brackets mounted on the legs. The table top, bench or other structure can then be placed on the upper brackets properly aligned with the legs and the brackets attached to the table. By this procedure, the necessity for accuracy in locating legs with respect to the floor brackets can be automatically satisfied.

Assuming a single pedestal unit has been in use and is to be removed, the top or other unit supported on the pedestal is rotated and then lifted off the top of the tube. It is at this point that the lubricious surface characteristic of the sleeves is important. This characteristic permits the sliding motion incident to the relative rotational movement between bracket and the sleeve. This is true even though the bracket and sleeve have been very forcibly pressed together such as may occur from extended usage or the placing of heavy objects on the surface or several people leaning heavily on the table. If the invention is used with seating, this could result from a person sitting down forcibly. In fact, it has been found that the table, chair or other object mounted on the pedestal or leg can be readily removed simply by lifting vertically without initial rotation. It is for this reason that the invention can be used with units which require plural pedestals.

Once the top has been removed, the leg can be disengaged from the floor bracket by the same procedure, i.e., turning and then lifting out of the lower bracket. Thus, the units can be quickly and easily erected or disassembled for removal. Likewise, the supported unit and the legs with the sleeves attached can be stored very compactly. This is accomplished without sacrifice of stability and dependability. After the legs have been removed, the socket in the lower bracket can be temporarily occupied with a suitable plug of wood or plastic such that no opening will remain to snag a high heel or the like. These plugs are not attached and can be made readily removable when the unit is to be re-erected. To further improve the utility of this invention, the lower or floor brackets can be designed to be fully recessed with their top surfaces flush with the floor.

Of course, it is understood that the above are merely preferred embodiments of the invention and that various other embodiments as well as many changes and alterations may be made without departing from the spirit and broader aspects of the invention as defined in the hereinafter appended claims.

I claim:

1. A detachable pedestal for supporting an object, said pedestal having an elongated rigid leg member and a pair of brackets, one at each end; said leg being circular in cross section and of uniform diameter throughout its length, a tubular sleeve of synthetic resin material surrounding and bonded to each end of said leg, said sleeves each having a frusto-conical exterior surface characterized by a taper of about 2° whereby the exterior surface has its least diameter at the end of the sleeve adjacent the end of the leg; said brackets each having a socket the internal walls of which have a taper identical to that of the sleeve to be received therein and of a diameter large enough to receive therein the end of said leg with said sleeve thereon and of an axial length such that substantially all of the sleeve covering the end of said leg can be seated therein and when the sleeve has been pressed into the socket with sufficient force that the portion of the sleeve seated between the leg surface and the walls of the socket functions as a substantially incompressible lamina and supports the leg against lateral rocking movement relative to the central axis of the socket, said sleeves having a lubricious exterior surface whereby the sleeves and sockets can be separated and the leg withdrawn by an operator without the use of tools.

2. The pedestal described in claim 1 wherein said sleeve is cup-shaped and has a web portion extending across the end of the leg.

3. The pedestal described in claim 2 wherein said leg is tubular and the web portion of the sleeve at one end of said leg has an opening of approximately 1/16 inch diameter to permit air flow therethrough to maintain substantial air pressure balance between said interior and exterior of the tubular leg.

4. The pedestal described in claim 1 wherein said sleeves are molded from polypropylene.

5. A detachable pedestal for supporting an object, said pedestal having an elongated rigid leg member and a bracket at each end of said leg, one having means for securing it to the object and the other having means for securing it to a rigid supporting surface; said brackets having identical sockets, each socket having an open leg receiving end and being conical with its greatest diameter at its open end, the walls of said sockets being inclined approximately 2° to the central axis of the socket, a tubular sleeve surrounding and bonded to each end of said leg, said sleeves being formed of a synthetic resin material having lubricious surface characteristics and being substantially incompressible when forcibly pressed between two surfaces, the exterior surfaces of said sleeves having a conical shape complimentary to that of said sockets whereby when the ends of said leg are seated in said sockets each sleeve forms a jacket surrounding the leg between the leg and the walls of said sockets with the sleeve providing substantially uniform contact with the side walls of said sockets for holding said leg against any lateral or angular movement with respect to the centerline of said sockets but permitting separation of the leg from the sockets by either relative rotational plus axial movement or axial movement alone or one of the brackets or leg with respect to the other without the use of tool generated force.

6. Means for forming a joint between a support having an end portion of uniform diameter and a bracket having a socket of conical cross section and smooth walls, which walls are inclined to the socket's central axis about 2°, said means including a sleeve of synthetic resinous material characterized by a lubricious surface, said sleeve being bonded to and surrounding said support's end portion; said sleeve having an exterior surface of conical shape of a size to seat in and extend substantially the full depth of said socket, said sleeve being of a synthetic resin having enough compressibility to permit the sleeve to make contact throughout its exterior surface with the walls of the socket and under the loads imposed by use as a support for a unit of furniture such as a table to become incompressible whereby the support is rigidly held against lateral rocking movement when under eccentric loading, said sleeve permitting detachment of the bracket and sleeve upon application by an operator without the use of tools of either axial or combined axial and rotary motion of one of said support or leg with respect to the other.

7. Means for rigidly and detachably securing a supporting leg to an object, said means comprising a bracket secured to the object, said bracket having a recessed socket opening through one end of the bracket, the walls of said socket having a taper of approximately 2° with the greatest diameter being at said open end, one end of said leg being received in said socket, said one end being of uniform diameter throughout its length; a cylindrical sleeve having a uniform internal diameter mounted on and surrounding said one end of said leg, said sleeve having a length substantially equal to the depth of said socket, the external surface of said sleeve having a taper complementary to the taper of said socket, said sleeve being of a plastic material characterized by a lubricious surface and when firmly seated in said socket with all of the external surface of said sleeve within the socket in contact with and pressed against the internal surface of said socket forming a substantially incompressible support for the leg preventing any lateral rocking movement of the leg relative to the socket, the lubricious exterior surface of said sleeve permitting the leg to be detached from the socket without the use of tools by either twisting or axially withdrawal of the leg from the socket.

8. Means for rigidly and detachably securing a supporting leg to an object as described in claim 7 wherein said sleeve is bonded to said leg.

9. Means for rigidly and detachably securing a supporting leg to an object as described in claim 8 wherein said tapered inside face of said socket is smooth whereby the socket does not provide any interference generated resistance to relative movement between the sleeve and the socket which movement is either rotational or axial.

* * * * *

UNITED STATES PATENT AND TRADEMARK OFFICE
CERTIFICATE OF CORRECTION

PATENT NO. : 4,925,140

DATED : May 15, 1990

INVENTOR(S) : Richard J. Camarota

It is certified that error appears in the above-identified patent and that said Letters Patent is hereby corrected as shown below:

Column 5, line 1:
"$2\frac{1}{2}$" should be -- $2-2\frac{1}{2}$ --

Column 6, line 52:
"alone or" should be --alone of--.

Signed and Sealed this

Seventh Day of April, 1992

Attest:

HARRY F. MANBECK, JR.

*Attesting Officer*     *Commissioner of Patents and Trademarks*